May 2, 1961 C. PEAVY 2,981,996
TILE EXTRUSION MACHINE
Filed July 18, 1957 2 Sheets-Sheet 1

INVENTOR.
CLARENCE PEAVY
BY
Salvatore G. Militana
ATTORNEY

May 2, 1961 C. PEAVY 2,981,996
TILE EXTRUSION MACHINE
Filed July 18, 1957 2 Sheets-Sheet 2

INVENTOR.
CLARENCE PEAVY
BY
Salvatore G. Militana
ATTORNEY

United States Patent Office 2,981,996
Patented May 2, 1961

2,981,996
TILE EXTRUSION MACHINE

Clarence Peavy, Hallandale, Fla., assignor, by mesne assignments, to Lang-Giffen Company, a corporation of Florida
Filed June 18, 1957, Ser. No. 666,427
5 Claims. (Cl. 25—43)

This invention relates generally to the manufacture and production of tile but is more specifically directed to the production of tile made of cement and the like by the extrusion thereof.

The present invention is an improvement of the tile manufacturing machine shown and described in my patent serial No. 2,641,819, entitled Tile Manufacturing Machine. In that device there is utilized both a tamper and a rotary arcuate impeller for fabricating tile. The present invention dispenses with the tamper and substitutes therefor and adjustable extrusion block which in combination with a rotary straight blade impeller in lieu of the arcuate impeller produces tile of any desired compactness with its outer surface having a trowel finish.

Therefore, a principal object of the present invention is to provide a tile manufacturing machine with an extrusion block which is capable of producing tile of any desired compactness by a simple adjustment of the extrusion block without interfering with the operation of the machine.

A further object of the present invention is to provide a tile manufacturing machine with an extrusion block and a rotary impeller wherein the latter during its rotary motion forces cementitious material onto a pallet which is being borne on an endless belt system.

A still further object of the present invention is to provide a tile manufacturing machine described as above wherein the cementitious material which is impelled by a rotating impeller is entrapped between an extrusion block on the upper side and a pallet on the lower side and becomes extruded as the pallet moves beyond the forward edge of the extrusion block.

A still further object of the present invention is to provide a tile manufacturing machine with an adjustable extrusion block which performs the double function of extruding a tile and giving it a trowel-like finish on its outer surface.

A still further object of the present invention is to provide a tile manufacturing machine with liners for the various working parts which can be replaced as they become worn thereby effecting an economy in the cost of operation.

With these and other objects in view, the invention will be best understood from a consideration of the following detailed description taken in connection with the accompanying drawings forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 2:
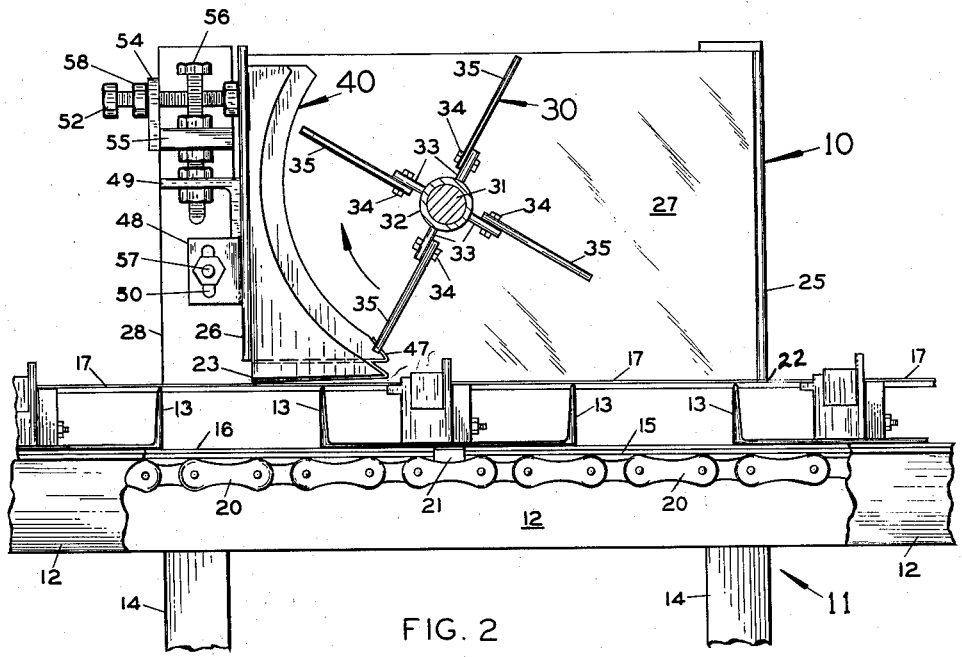
Figure 2 is a cross sectional view taken along the line 2—2 of Figure 1.
Figure 1:
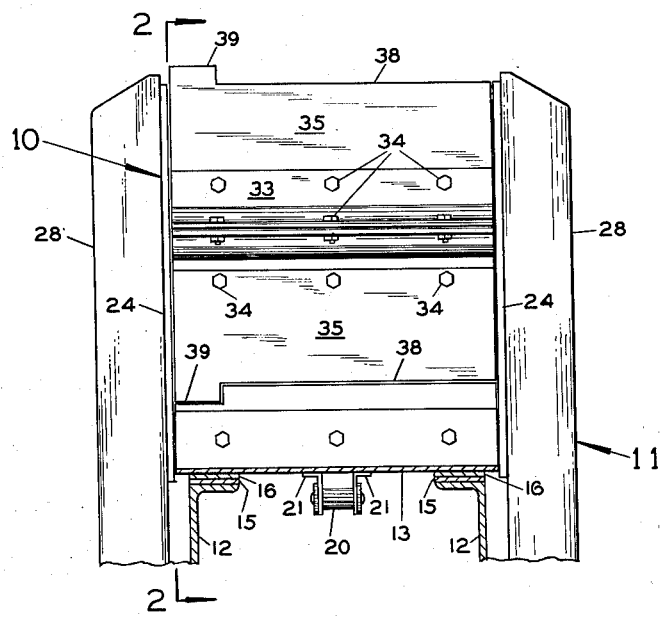
Figure 1 is a front elevational view of my tile manufacturing machine with the support structure shown only in part.
Figure 3:
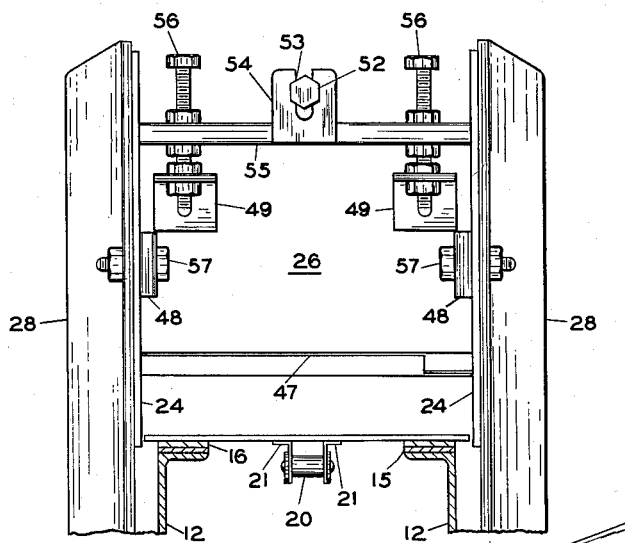
Figure 3 is a rear elevational view thereof.
Figure 4:
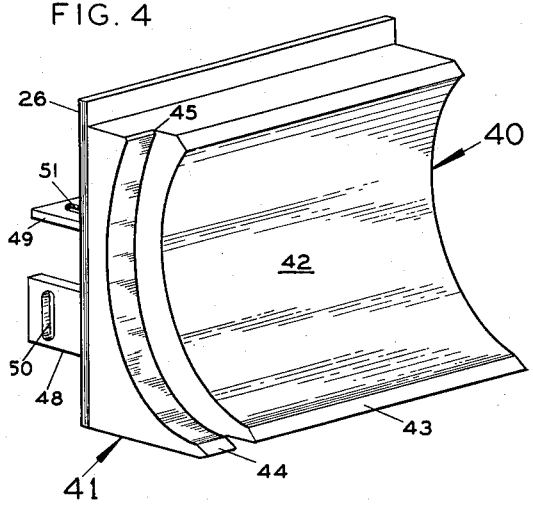
Figure 4 is a perspective view of an extrusion block shown removed from the machine.

Referring to the drawings wherein like numerals are used to designate similar parts throughout the several views, the numeral 10 refers to a hopper mounted on a stand or support structure 11. The support structure 11 though shown only in part is substantially similar to that shown in my previously cited patent consisting of a pair of rails 12 mounted on legs 14 upon which a plurality of pallet support heads 13 is slidably mounted. The pallet support heads 13 bridge the rails 12 with the end portions of the heads 13 riding on the rails 12. A liner 15 is welded or otherwise secured to the rails 12 while the heads 13 are provided with liners 16 which slide along the liners 15 so that when the liners 15 and 16 become worn they are readily replaced by other similar liners thereby effecting an economy of manufacturing costs.

At the midportion of the pallet support head 13 on their lower wall, an endless chain 20 is secured thereto by lugs 21 pivotally mounted to the chain 20 and welded at their upper ends to the heads 13. The chain 20 extends the full length of the support structure 11 being in mesh engagement with sprocket wheels (not shown) mounted at the ends of the support structure 11 and the endless chain 20 returning at a lower level as shown in my patent cited hereinabove.

The hopper 10 which is so mounted on the support structure 11 that the endless chain 20 enters at the rear portion 22 and leaves the hopper 10 at the front portion 23 comprises of side walls 24, a rear wall 25 and a front wall 26 to form an open top and bottom chamber 27. On each side of the hopper 10 adjacent the front wall 26 are upright support members 28 upon which the front wall 26 is adjustably mounted as is explained in greater detail hereinafter.

Figure 7:
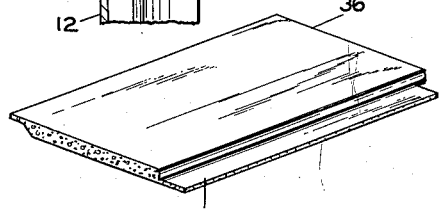
Figure 7 is a perspective view of a roofing tile manufactured by the tile manufacturing machine.
Figure 5:
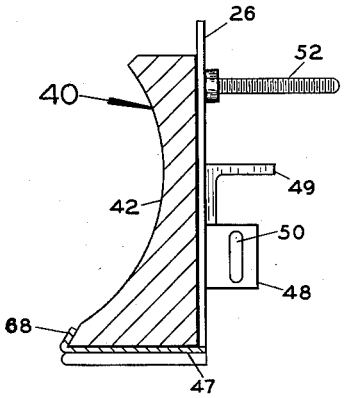
Figure 5 is a vertical sectional view of the extrusion block.
Figure 6:
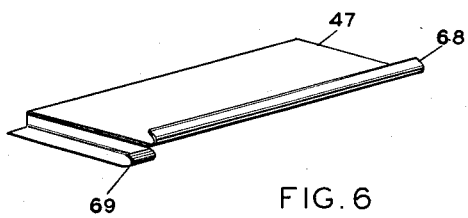
Figure 6 is a perspective view of an extrusion block liner.

Mounted within the chamber 27 of the hopper 10 is an impeller 30 which operates as a combination rotatable agitating and packing device. The impeller 30 is mounted on a shaft 31 whose ends are journalled on the side walls 24 and have power transmission means (not shown) such as pulleys, belts, etc., for rotating the impeller shaft 31. The impeller 30 consists of a hub 32 on which a plurality of blade supports 33 extend longitudinally thereon and are symmetrically disposed about the hub 32. By way of illustration there are shown four such blade supports 33, though any desired number may be used. Removably secured to the blade supports 33 as by bolts 34 are impeller blades 35 whose outer configuration is that of a cement tile 36 to be manufactured by this device as shown by Figure 7. Any of the conventional shaped tile may be produced by this machine since the outer portion of the impeller blades 35 may be shaped as desired. The tile 36 is a conventional shingle cement tile having a substantially flat rectangular shape with an overlapping edge portion 37. The impeller blades 35 are provided with an outer straight edge 38 which forms the flat portion of the tile 36 and an outwardly extending shoulder 39 which forms the stepped-down overlapping portion 37 of the tile 36.

Means are provided to assist the impeller 30 in properly agitating the cementitious material in the hopper 10 and to extrude the tile to a desired degree of compactness, comprising an extrusion block 40 secured to the front wall 26. The extrusion block 40 is provided with two working surfaces, namely, a horizontally disposed extrusion surface 41 and a vertically disposed agitating surface 42. The extrusion surface 41 is substantially identical in configuration with the upper surface of the tile 36 having a flat portion 43 and a shoulder portion 44. The agitating surface 42 is arcuate in shape lying in close proximity to the path swept by the outer edge of impeller blades 35 and provided with a stepped down portion 45 to receive the shoulder 39 of the impeller blades 35. The function of the agitating surface 42 is to compel the cementitious material which is in the hopper and has not been deposited on the pallets 17 to be agitated and brought into position on the following revolutions of the impeller 30 to become impelled onto the space between the pallets 17 and the extrusion surface 41 of the extrusion block 40.

The extrusion block 40 is only as effective as an extruding device as determined by the angle the extrusion surface 41 bears with relation to the horizontal plane in which the pallets 17 are travelling. For example, if the extrusion surface 41 were positioned horizontally and in parallel relation with the pallets 17 which are moving from right to left as shown by the arrow in Figure 2, there will be virtually no compacting or extruding work done on the cement tile 36. The tile 36 would be only so compact as is effected by the rapidly revolving impeller blades 35 which by virtue of centrifugal force, ejects the cementititious material in the direction of the pallets 17 as they move in the direction of the extrusion block 40.

Now by tilting the extrusion block 40 as is explained hereinafter, so that the lower edge of the arcuate surface 42, namely the leading edge 43 of the extrusion block 40 is a greater distance from the pallets 17 than the lower edge of the extrusion block 40 at the position of the front wall 26, the tile 36 thus being formed will be extruded and its compactness will be determined by the extent of the aforesaid inclination of the lower or extrusion surface 41 of the extrusion block 40. As the rapidly rotating impeller 30 deposits cementitious material at the lower edge 43 of the arcuate surface 42 it fills that space between the aforesaid edge and the pallet 17; as the pallet 17 is carried forwardly in the direction of the front wall 26, the space between the extrusion surface 41 and the pallet 17 decreases since the extrusion block 40 is tilted as aforesaid. The cementitious material is trapped between the extrusion surface 41 and the pallet 17, so that the volume of the cementitious material must be reduced and is thereby caused to become compressed. As the newly formed tile emerges from the front edge of the extrusion block 40, the surface of the tile is given a trowel finish as the cementitious material is being extruded. In order to prevent the extrusion surface 41 from becoming worn by the abrasive effect caused by the moving cementitious material, there is provided a liner 47 shaped to fit over the extrusion surface 41 with lip portions 68 and 69 to engage the lower edges 43 and 44 of the arcuate surface 42 to maintain the liner 47 in position. The liner 47 does not have to be secured to the extrusion block 40 since the cementitious material being extruded forces the liner 47 upwardly in contact relation with the extrusion surface 41 of the extrusion block 40.

As stated hereinabove, the extrusion block 40 is secured to the front wall 26 of the hopper 10, which front wall 26 is provided with a pair of vertically disposed lugs 48 each having an elongated bore 50 and a pair of horizontally disposed lugs 49 each having an elongated bore 51 thereon. Also, at the upper mid-portion of the front wall 26 is a bolt 52 extending forwardly thereof and received by an open slot 53 in a plate member 54 which is secured to a cross member 55. The cross member 55 extends between the side walls 24 having its ends welded or otherwise secured thereto and is provided with a pair of bores for receiving vertically disposed bolts 56 therethrough. The bolts 56 extend through the bores 51 in the lugs 49 and secured by nuts as shown. The function of the bolts 56 is to position the extrusion block 40 vertically at any desired position above the pallets 17 as they are slidably carried therebelow so as to manufacture tile of a desired thickness. Bolts 57 extend through bores in the upright members 28 and through bores 50 in the lugs 48 for securing the lower portion of the extrusion block 40 to the support structure 28. The elongated bore 50 permits the vertical adjustment of the extrusion block 40 as explained hereinabove.

When it is desired to adjust or change to increase the extrusion effect or the packing action of the extrusion block 40, the extrusion block 40 is tilted by threading a nut 58 on the bolt 52 against the member 54 to compel the extrusion block 40 to pivot about the bolts 57 causing the lower edge 43 of the arcuate surface 42 to swing upwardly or away from the pallets 17 resting on the pallet support heads 13. This increases the space 18 at the leading edge 43 of the extrusion block 40 and decreases the space 23 at the front of the hopper 10 and the extrusion block 40. The greater the difference in the size of these spaces, the greater the compacting effect produced by the extrusion block 40.

In the normal operation of this tile manufacturing machine, a continuous feed (not shown) maintains a supply of cementititious material in the hopper 10. The pallets 17 being carried forwardly by the pallet head 13 on the moving endless chain 20 cause the cementitious material in the hopper 10 to be forced into the path of the revolving impeller blades 35 which pick up the cementitious material and eject same by centrifugal force onto the pallets 17 as the pallets 17 move into vertical alignment with the impeller shaft 31. This ejected cementitious material now moves with the pallet 17 on which it is resting and becomes engaged by the extrusion surface 41 of the extrusion block 40. This surface 41 being tilted downwardly compresses the cementitious material on the pallet 17 and trapped therebetween. As the exposed surface of the liner 47 becomes worn, the extrusion block 40 is lowered by unthreading the bolts 56. Also, the outer edges of the impeller blades 35 will become worn. They can be readily replaced by loosening the bolts 34 and removing the worn blades 35 and replacing them with new impeller blades 35. The liner 47 may be readily replaced when it becomes worn by merely slipping the liner 47 from its position beneath the extrusion block 40 and placing another liner 47 thereon.

What I claim as new is:

1. A tile manufacturing machine comprising a hopper for containing mortar, said hopper having front and rear end portions and an open bottom portion, pallet support means slidably mounted along said open bottom portion entering said hopper at said rear end portion and leaving at said front end portion, a pallet positioned on said pallet support means, rotatable impeller means mounted in said hopper transversely to the path of movement of said pallet and in proximity of said front end portion for impelling mortar onto said pallet, said rotatable impeller means comprising shaft means and substantially flat impeller blades extending substantially longitudinally of said shaft means and having outer edge portions extending substantially the width of said pallet, tile extrusion means mounted at said front end portion of said hopper in close proximity to said outer edges of said impeller blades, said tile extrusion means having an extrusion wall whose configuration is substantially similar to the tile being manufactured, a leading edge at one end of said extrusion wall in close proximity of said outer edge portions of said impeller blades whereby mortar is impelled onto said pallet at the position of said leading edge, and a trailing edge at the other end of said extrusion wall, said extrusion wall being positioend above and in spaced relation to said pallet a distance substantially equal to the thickness of the tile being manufactured whereby said pallet moves beneath said extrusion wall in the direction from said leading edge to said trailing edge to extrude said tile, said front end portion of said hopper having an arcuate inner surface of similar configuration extending from said leading edge of said extrusion wall in similarly close proximity to the outer edge portions of said impeller blades, said arcuate surface being substantially concentric with said impeller means, so as to prevent the accumulation and setting of any of the mortar in dead spaces in said hopper above said leading edge.

2. A tile manufacturing machine comprising a hopper for containing mortar, said hopper having front and rear end portions and an open bottom portion, pallet support means slidably mounted along said open bottom portion entering said hopper at said rear end portion and leaving at said front end portion, a pallet positioned on said pallet support means, rotatable impeller means mounted in said hopper transversely to the path of movement of said pallet and in proximity of said front end portion for impelling mortar onto said pallet, said rotatable impeller means comprising shaft means and impeller blades extending substantially longitudinally of said shaft means and having outer edge portions extending substantially the width of said impeller blades and said pallet and a configuration substantially similar to that of the tile being manufactured by said machine, tile extrusion means mounted at said front end portion of said hopper having an arcuate wall portion substantially concentric with said impeller means, said arcuate wall portion having a configuration substantially similar to that of said outer edge portions of said impeller blades and lying in close proximity thereto during the major portion of their upward movement, said tile extrusion means having an extrusion wall whose configuration is substantially similar to the tile being manufactured, a leading edge at one end of said extrusion wall joining said arcuate wall portion, which extends upwardly therefrom, and a trailing edge at the other end adjacent said front end portion of said hopper, said extrusion wall being positioned in spaced relation to said pallet a distance substantially equal to the thickness of the tile being manufactured, and adjustable means securing said tile extrusion means to said hopper whereby said leading edge of said extrusion surface is positioned a slightly greater distance from said pallet as said trailing edge for compacting mortar previously impelled onto said pallet by said rotating impeller means at the position of the leading edge as said pallet is carried by said pallet support means along and beneath said extrusion wall of said extrusion means.

3. A tile manufacturing machine comprising a hopper for containing mortar having a pair of spaced apart side walls and end walls joining said side walls, rail means mounted between said side walls substantially horizontally and parellel to said side walls, pallet support means slidably mounted on said rails, a pallet positioned on said pallet support means, rotatable shaft means mounted in said hopper transversely to the path of movement of said slidable support means, impeller means mounted on said rotatable shaft means, said impeller means having blades extending substantially longitudinally and radially of said shaft, said blades having outer edges whose configuration is similar to that of the tile being manufaceured, on extrusion block positioned on said front wall of said hopper, said extrusion block having an arcuate front wall portion in close proximity to said outer edges of said rotating blades and a substantially similar configuration as said outer edges, and an extrusion surface above and in close spaced relation with said pallet, said extrusion surface having a leading edge at one end joining said arcuate surface whereby mortar is impelled onto said pallet at the position of said leading edge and a trailing edge at its other end adjacent said front end wall of said hopper, lug means secured to said extrusion block, bolt means mounted on said hopper and engaging said lug means for adjustably securing said extrusion block vertically on said hopper and pivot adjusting means connecting said extrusion block and said hopper adapted to swing said extrusion block about said bolt means as an axis of rotation whereby said leading edge of said extrusion surface is positioned a greater distance from said pallet as said trailing edge for extruding cementitious tile.

4. The structure as recited by claim 3 and liner means removably mounted on said extrusion block in contact relation with said extrusion surface said liner means having substantially the same configuration as the outer surface of the tile being manufactured by said machine.

5. A tile manufacturing machine comprising a hopper for containing mortar, said hopper having front and rear end portions and an open bottom portion, pallet support means slidably mounted along said open bottom portion entering said hopper at said rear end portion and leaving at said front end portion, a pallet positioned on said pallet support means, rotatable impeller means mounted in said hopper transversely to the path of movement of said pallet and in proximity of said front end portion for impelling mortar onto said pallet, said rotatable impeller means comprising shaft means and substantially flat impeller blades extending substantially longitudinally of said shaft means and having outer edge portions extending substantially the width of said pallet and having substantially the same configuration as said tile, tile extrusion means mounted at said front end portion of said hopper in close proximity to said outer edges of said impeller blades, said tile extrusion means having an extrusion wall whose configuration is substantially similar to the tile being manufactured, a leading edge at one end of said extrusion wall in close proximity of said outer edge portions of said impeller blades whereby mortar is impelled onto said pallet at the position of said leading edge, and a trailing edge at the other end of said extrusion wall, said extrusion wall being positioned above and in spaced relation to said pallet a distance substantially equal to the thickness of the tile being manufactured with said trailing edge positioned slightly closer to said pallet than said leading edge whereby said pallet moves beneath said extrusion wall in the direction from said leading edge to said trailing edge to extrude said tile, said front end portion having an arcuate inner surface of similar configuration extending from said leading edge of said extrusion wall in similarly close proximity to the outer edge portions of said impeller blades, said arcuate surface being substantially concentric with said impeller means, so as to prevent the accumulation and setting of any mortar in dead spaces in said hopper above said leading edge.

References Cited in the file of this patent

UNITED STATES PATENTS

| | | |
|---|---|---|
| 39,884 | Chambers | Sept. 15, 1863 |
| 1,367,227 | Baumgartl | Feb. 1, 1921 |
| 1,578,467 | Phillips et al. | Mar. 30, 1926 |
| 1,929,301 | Batcheller | Oct. 3, 1933 |
| 2,320,728 | Hume | June 1, 1943 |
| 2,492,297 | Lagarde | Dec. 27, 1949 |
| 2,641,819 | Peavy | June 19, 1953 |
| 2,705,069 | Patten | Mar. 29, 1955 |
| 2,734,249 | Willis | Feb. 14, 1956 |
| 2,804,672 | Altschuler | Sept. 3, 1957 |
| 2,847,749 | Lang | Aug. 19, 1958 |

FOREIGN PATENTS

| | | |
|---|---|---|
| 22,365 | Denmark | Aug. 7, 1917 |
| 739,860 | Great Britain | Nov. 2, 1955 |